United States Patent
Fortin et al.

(10) Patent No.: US 7,562,692 B2
(45) Date of Patent: Jul. 21, 2009

(54) ALUMINUM ALLOY-BORON CARBIDE COMPOSITE MATERIAL

(75) Inventors: Jean-Yves Fortin, Jonquiere (CA); Jacques Sheehy, Jonquiere (CA); Camil Jean, Jonquiere (CA); Paul Brisson, Jonquiere (CA); Uta Harnisch, Chicoutimi (CA); Don Allen Doutre, Kingston (CA); Xiao-Guang Chen, Jonquiere (CA)

(73) Assignee: Alcan International Limited, Montreal, Quebec (CA)

( * ) Notice: Subject to any disclaimer, the term of this patent is extended or adjusted under 35 U.S.C. 154(b) by 559 days.

(21) Appl. No.: 10/532,188

(22) PCT Filed: Oct. 24, 2003

(86) PCT No.: PCT/CA03/01624

§ 371 (c)(1),
(2), (4) Date: Oct. 26, 2005

(87) PCT Pub. No.: WO2004/038050

PCT Pub. Date: May 6, 2004

(65) Prior Publication Data

US 2006/0090872 A1    May 4, 2006

(51) Int. Cl.
    *B22D 19/14*    (2006.01)
(52) U.S. Cl. .......................... 164/97; 164/98
(58) Field of Classification Search ............ 164/97, 164/98
    See application file for complete search history.

(56) References Cited

U.S. PATENT DOCUMENTS

| 4,786,467 A | 11/1988 | Skibo et al. |
| 5,186,234 A | 2/1993 | Hammond et al. |
| 5,965,829 A | 10/1999 | Haynes et al. |
| 6,592,687 B1 * | 7/2003 | Lee et al. ............... 148/418 |
| 2003/0179846 A1 * | 9/2003 | Murakami et al. ......... 376/272 |
| 2003/0192627 A1 * | 10/2003 | Lee et al. ............... 148/439 |

OTHER PUBLICATIONS

Lucas, Stephens, Greulich: "The Effect of Reinforcent Stability on Composition Redistribution in Cast Aluminium Metal Matrix Composites" Materials Science and Engineering, No. A131, 1991, pp. 221-230, XP002270490.

Kennedy, Brampton: "The Reactive Wetting and Incorporation of B4C Particles into Molten Aluminium" Scripta Materialia, No. 44, 2001, pp. 1077-1082, XP002270491 Uk See introduction and Experimental Procedure. p. 1077-p. 1078 table 1.

Chernyshova, Rebrov: "Interaction Kinetics of Boron Carbide and Silicon Carbide With Liquid Aluminium" Journal of the Less Common Metals, No. 117, 1986, pp. 203-207, XP002270492 Russia.

Jiang, Shan and Wang, Improvement on 2219 Alloy Melting—casting Process, 1994-2007 China Academic Journal Electronic Publishing House.

Wanfang Data: "GB/T 3190-1996".

* cited by examiner

*Primary Examiner*—Kuang Lin
(74) *Attorney, Agent, or Firm*—RatnerPrestia

(57) ABSTRACT

A cast composite material is prepared by furnishing an aluminum-based matrix alloy and forming a mixture of free-flowing boron carbide particles and the aluminum-based matrix alloy in molten form which is stirred to wet the matrix alloy to the boron carbide particles and to distribute the particles throughout the volume of the melt. The molten mixture is then cast. The fluidity of the molten mixture is maintained by (a) maintaining the magnesium content of the matrix metal below about 0.2% by weight, or (b) starting with a matrix metal containing less than 0.2% by weight magnesium and adding further magnesium to the mixture a short time before casting, or (c) having at least 0.2% by weight titanium present in the mixture.

7 Claims, 2 Drawing Sheets

ALUMINUM ALLOY-BORON CARBIDE COMPOSITE MATERIAL

This application is a U.S. National Phase Application of PCT International Application PCT/CA03/01624 filed Oct. 24, 2003.

TECHNICAL FIELD

This invention relates to cast metal matrix composite materials and, more particularly, to a cast aluminum alloy-boron carbide metal matrix for use as a structural material, particularly as a neutron absorbing material.

BACKGROUND ART

There is a great interest in the nuclear energy industry for construction materials which will absorb, and therefore not release, neutrons, e.g. in containers for waste fuel. Boron carbide has been used for many years in the nuclear industry as a neutron absorbing material and is a commercially available material meeting ASTM standards. Boron carbide reinforced metal matrix composites also have application as lightweight structural materials.

International Application WO 00/26921 filed in the name of Reynolds Metals Company and published on May 11, 2000, describes the use of an aluminum alloy-boron carbide composite as a neutron absorbent material for storage of both hot section and spent nuclear fuel. These composite products were prepared by a powder metallurgical technique in which aluminum alloy powder was first mixed with boron carbide particles. The preferred aluminum alloy for the matrix was found to be an AA6000 series alloy, such as AA6010 alloy, which was mixed with at least 15% boron carbide particles. The AA6000 series alloys contain at least 0.25% Mg and AA6010 contains at least 0.8% Mg. The reference found Al, Mg and Si to be acceptable elements, while finding AA2000, AA3000 and AA7000 alloys to be undesirable.

Powder metallurgy is an expensive technique for manufacturing large industrial components as required for the nuclear industry. There is, therefore, a need for a simpler and less expensive method for producing aluminum alloy-boron carbide composite products. Skibo et al. U.S. Pat. No. 4,786,467 describes a method of making aluminum alloy composites in which a variety of non-metallic particles are added to the aluminum alloy matrix. Among a wide variety of non-metallic particles that were mentioned, boron carbide was included. However, no tests are shown using boron carbide and the tests were conducted primarily with silicon carbide particles. In the Skibo method, the silicon carbide particles were mixed into a molten aluminum alloy and the mixture was then stirred to wet the aluminum alloy to the particles. The mixed material was then cast.

It was found that there can be problems of reaction between certain filler particles and the metal alloy matrix, such as is described in Hammond et al. U.S. Pat. No. 5,186,234. That patent was overcoming a problem encountered in certain situations where the molten composite material cast very poorly, had low fluidity and resulted in an unacceptable product. This was particularly a problem in a foundry remelter for holding molten composites containing SiC in an aluminum matrix.

It was found that certain alloying elements can inhibit wetting of the refractory particles in a metal matrix composite, such as is described in Skibo U.S. Pat. No. 5,083,602, in which case such wettability inhibiting elements were added after the alloy had wetted the particles. This did not address the problem of attack on the refractory by magnesium during wetting, since magnesium was described as useful in encouraging wetting in the first (wetting) step.

Lloyd et al. EP 0 608 299 describes a procedure where aluminum particles are dispersed in an aluminum alloy containing about 0.15 to 3% Mg where strontium is added to suppress the formation of spinal phase, which otherwise forms and depletes the matrix of available magnesium.

Hansson et al. U.S. Pat. No. 5,246,057 describes a procedure where alumina particles are dispersed in an aluminum alloy containing an initially high Mg concentration to produce a stable spinel coating on the alumina which is subsequently reduced to the desired magnesium level by dilution.

Ferrando et al. U.S. Pat. No. 5,858,460 describes a method of producing a cast composite for aerospace applications using boron carbide in a magnesium-lithium or aluminum-lithium alloy wherein a silver metallic coating is formed on the particle surfaces before mixing them into the molten alloy. This was done to overcome a problem of poor wettability of the particles by the alloy and reactivity.

Pyzik et al. U.S. Pat. No. 5,521,016 describes a method of producing an aluminum-boron carbide composite by infiltrating a boron-carbide preform with a molten aluminum alloy. The boron carbide is initially passivated by a heat treatment process.

Rich et al. U.S. Pat. No. 3,356,618 describes a composite for nuclear control rods formed from boron carbide or zirconium diboride in various metals where the boron carbide is protected by a silicon carbide or titanium carbide coating applied, for example by chemical vapour deposition, before forming the composite. The matrix metals are high temperature metals however, and do not include aluminum alloys.

Jason S. H. Lo, CA 2,357,323 describes a composite for brake applications formed from a preform of refractory particles, whiskers or fibres which is infiltrated (e.g. by squeeze casting) with an aluminum alloy containing 1 to 40% binary intermetallic particles formed by adding a second metal powder to the aluminum alloy before infiltration. The intermetallic particles are formed both in the molten aluminum and also in heat treatments of the finished composite. The refractory particles include boron carbide and the second metal includes titanium.

DISCLOSURE OF THE INVENTION

Attempts were made by the present inventors to make aluminum alloy-boron carbide composite products in accordance with Skibo et al. U.S. Pat. No. 4,786,467. However, only very limited amounts of boron carbide particles could be added to the molten aluminum before the mixture became too viscous to be cast. It has been found according to the present invention that the problem is the presence of magnesium in the metal matrix. Thus, it has been found that an aluminum alloy-boron carbide composite for structural, e.g. neutron absorption, applications can retain its fluidity by (a) maintaining the magnesium content of the matrix metal below about 0.2% by weight or (b) starting with a matrix metal containing less than 0.2% by weight magnesium and adding further magnesium to the mixture a short time before casting or (c) having at least 0.2% by weight titanium present in the mixture. The composite in its broadest aspect may contain from about 10 to about 40 volume percent of free-flowing boron carbide particles and from about 90 to about 60 volume percent of molten aluminum alloy.

When fluidity is controlled by maintaining the magnesium content below 0.2% by weight, the magnesium content is preferably less than about 0.1% by weight and more preferably less than about 0.05% by weight.

During holding of the molten composite, reactions are believed to occur which lower the fluidity of the composite. Both wrought alloys and foundry alloys can be used if the low magnesium criteria is applied.

Thus, the present invention in one aspect provides a method of manufacturing a cast composite material, comprising the steps of: providing an aluminum-based matrix alloy containing less than about 0.2 weight percent magnesium; preparing a mixture of from about 10 to about 25 volume percent of free-flowing boron carbide particles and from about 90 to about 75 volume percent of the molten matrix alloy; stirring the molten mixture to wet the aluminum alloy to the boron carbide particles and to distribute the particles throughout the volume of the melt; and casting the molten mixture.

The aluminum composite casting obtained is well adapted for such further operations as (a) remelting and casting a shape, (b) extrusion and (c) rolling or (d) forging.

For producing wrought aluminum alloys, a preferred composition is an alloy of the AA1000 series having less than 0.2 weight percent magnesium. For foundry alloys a preferred composition is an aluminum alloy containing about 5 to 10% by weight silicon and less than 0.2% by weight magnesium.

The amount of boron carbide added is typically the highest amount possible that will permit castability. This is generally in the range of 10 to 25% by volume in the composite and preferably about 15 to 20% by volume.

Even under conditions of relatively low magnesium in the composition there is a tendency for the aluminum alloy matrix to react with the boron carbide over time, and therefore limit the usefulness of the composite since delays in casting and excessive holding times on remelt can inevitably occur. There is also a limit to the amount of boron carbide that can be added under such conditions and this limit is less than what can normally be used in other less reactive situations. Finally the limitation on magnesium levels limits the scope of applications somewhat since magnesium imparts certain desirable mechanical properties to metal matrix composites.

The composites and method of production can therefore be further modified to permit longer holding times (either in the initial production or in remelting and casting operations—thus making them particularly preferred for remelting and casting operations such as may occur during foundry casting of parts or in recycling of scrap materials) and/or higher boron carbide loadings. These modifications to the invention include (a) having at least 0.2 weight percent titanium present in the mixture and/or (b) adding further magnesium to the mixture a short time before casting.

Thus the present invention in a further aspect provides a method of manufacturing a composite material, comprising the steps of: providing an aluminum-based matrix alloy containing at least 0.2 weight percent titanium; preparing a mixture of from about 10 to about 40 volume percent of boron carbide particles and from about 90to about 60 volume percent of molten matrix alloy; stirring the molten mixture to wet the aluminum alloy to the boron carbide particles and to distribute the particles throughout the volume of the melt; and casting the molten mixture.

This aspect of the invention also provides a cast composite product comprising an aluminum alloy containing a uniform distribution of boron carbide particles dispersed in the aluminum alloy matrix where the concentration of boron carbide particles is from 10 to 40 volume percent and the concentration of titanium in the composite is at least 0.2 weight percent of the aluminum plus titanium.

For obtaining a composite with titanium in the above amounts, it is convenient to use an AA1xxx alloy containing titanium.

In yet a further aspect of the invention there is provided a method of manufacturing a composite material, comprising the steps of: providing an aluminum-based matrix alloy containing less than 0.2 weight percent magnesium; preparing a mixture of from about 10 to about 25 volume percent boron carbide particles and from about 90 to about 75 volume percent of molten matrix alloy; stirring the molten mixture to wet the aluminum alloy to the boron carbide particles and to distribute the particles throughout the volume of the melt; adding magnesium to the molten mixture; and casting the molten mixture within 20 minutes of adding the magnesium; wherein the amount of added magnesium raises the magnesium concentration in the aluminum alloy matrix to between 0.2 and 0.8 weight percent.

This aspect of the invention also provides a cast composite material comprising an aluminum alloy containing between 0.2 and 0.8 weight percent magnesium and between 10 and 25 volume percent boron carbide refractory particles dispersed in the alloy matrix.

According to a still further aspect of the invention there is provided a method of manufacturing a composite material, comprising the steps of: providing an aluminum-based matrix alloy containing less than 0.2 weight percent magnesium and at least 0.2 weight percent titanium; preparing a mixture of from about 10 to about 40 volume percent of boron carbide particles and from about 90 to about 60 volume percent of molten matrix alloy; stirring the molten mixture to wet the aluminum alloy to the boron carbide particles and to distribute the particles throughout the volume of the melt; adding magnesium to the molten mixture; and casting the molten mixture within 30 minutes of adding the magnesium; wherein the amount of added magnesium raises the magnesium concentration in the aluminum alloy matrix to between 0.2 or more weight percent.

This aspect of the invention also provides a cast composite material comprising an aluminum alloy containing 0.2 or more weight percent magnesium and between 10 and 40 volume percent boron carbide refractory particles dispersed in the alloy matrix, and at least 0.2 weight percent titanium in the composite based on the total aluminum plus titanium. The aluminum alloy matrix is preferably substantially free of aluminide intermetallics. The term "dispersed" means that the particles are distributed substantially uniformly throughout the matrix, typical of a particles distributed by stirring.

The aluminum alloy referred to hereinbefore is preferably selected from wrought alloys such as AA2xxx, AA3xxx, AA4xxx or AA6xxx, or casting alloys such as AA2xx or AA3xx plus the added titanium.

It is also particularly preferred that the magnesium be present in an amount of no more than 1.4 weight percent of the matrix alloy.

In the preceding embodiments containing added magnesium, it is preferred that the magnesium be added after the molten mixture has been stirred so that the wetting of the aluminum alloy to boron carbide is complete and the particles are distributed through the melt and it is particularly preferred that the magnesium be added while the composite is being transferred from the mixing vessel to the casting machine. For example, this may be done in a casting trough or in a transfer ladle. It is also preferred that the composite be mixed during the period of time between adding the magnesium and casting the product. This mixing is preferably carried out both in the vessel in which the composite is formed and in the trough or transfer ladle used to convey the composite to a casting machine for casting a product.

In the preceding embodiments it is particularly preferred that the boron carbide refractory be added as a free-flowing powder to the molten aluminum and that the mixing be carried out in a manner that limits the amount of gas entrained in the composite.

The preceding embodiments are useful as structural materials particularly for neutron absorbing applications. A minimum boron carbide content of 10 volume percent is needed to provide useful neutron absorbing properties. The upper level of boron carbide is dictated by the fluidity requirements of the mixture and it is preferable to limit this to 25 volume percent in situations where the titanium is not added to improve fluidity or, in cases of titanium additions, where the magnesium level is above 0.2% by weight.

The mixture is amenable to any form of casting including DC casting of billets or slabs, casting or ingots for future remelting and casting, or casting into shapes using any convenient form of shape casting.

In the composites containing added titanium, the titanium is preferably present in part as an intermetallic compound coating at least part of the surfaces of the boron carbide refractory particles. The intermetallic compounds may additionally contain either boron or boron plus aluminum. The refractory particles are present as a uniform dispersion of particles typical of powders that are free-flowing powders added to an alloy mixture with stirring.

Although not wishing to be bound by any theory, it is believed that the addition of titanium causes a reaction with the surface of the boron carbide particles to form a stable titanium-containing compound on the surface that does not disperse in the matrix and prevents further attack by the aluminum alloy in the matrix. These compounds contain boron and/or carbon in addition to titanium and may have a variety of stoichiometric or non-stoichiometric compositions. Thus the composite can be held for extended periods of time without loss of fluidity caused by the gradual formation of aluminum carbides etc., and at the same time, higher concentrations of boron carbide can be added without loss of fluidity before casting. The stabilized boron carbide is also more resistant to attack by magnesium containing alloys.

It has been found that at titanium levels of less than 0.2 weight percent measured with respect to the total aluminum plus titanium, the stabilizing effect is insufficient to overcome a gradual loss of fluidity. It is believed that this may relate to inadequate coverage of the particle surfaces by the stabilizing layer of titanium containing materials.

It is believed that the surface stabilizing titanium-containing materials are more stable, for example, than Al—Ti intermetallic compounds. At the titanium levels used in the present invention, relatively little titanium is in solution and, absent the boron carbide, the remaining titanium would be present as an Al—Ti intermetallic. However, in the present invention such Al—Ti intermetallics appear to be converted to a large extent to the surface stabilizing compounds and few if any Al—Ti intermetallic particles can be found in the metal matrix. Higher levels of titanium therefore increase the stabilizing effect and the useful upper limit to the titanium concentration is that which is needed to coat and stabilize the boron carbide particles. Beyond that level, additional titanium is expected to form of titanium aluminides that may eventually produce unacceptable material properties. Accordingly, the maximum titanium level used in this invention is preferably no more than 5 weight percent based on the total aluminum plus titanium content.

Although the titanium effectively stabilizes the particles, magnesium in the alloy can displace one or more of the titanium surface compounds and start to degrade the particles. Therefore, the composites containing 0.2 weight percent or more of magnesium must be held for a limited period of time before casting, and it is preferred that alloys containing moderate amounts of magnesium be used (AA2xxx, AA3xxx, AA4xxx, AA6xxx, AA2xx or AA3xx) and most preferably that the amount of magnesium be limited to a maximum of 1.4 weight percent.

It will be understood that the titanium concentrations given in the foregoing description, whether with reference to the matrix alloy or the total composite, represent titanium in all forms. It is known that there is a definite solubility limit of titanium in aluminum and above that limit excess titanium comes out of solution as intermetallics or refractory compounds, including titanium-boron compounds. Thus an alloy or composite that is specified as containing at least 0.2% titanium includes the titanium in solution plus titanium in the form of Ti—Al or Ti—Al—B or Ti—B containing compounds. In both the alloy and composite the percentage titanium is determined on the basis of the total weight of titanium present divided by the weight of all aluminum alloying components including the total titanium. The titanium can be added in any convenient form, including master alloy (for example an Al-10% Ti master alloy) or as titanium containing granules or powders.

BEST MODES FOR CARRYING OUT THE INVENTION

EXAMPLE 1

Figure 1:
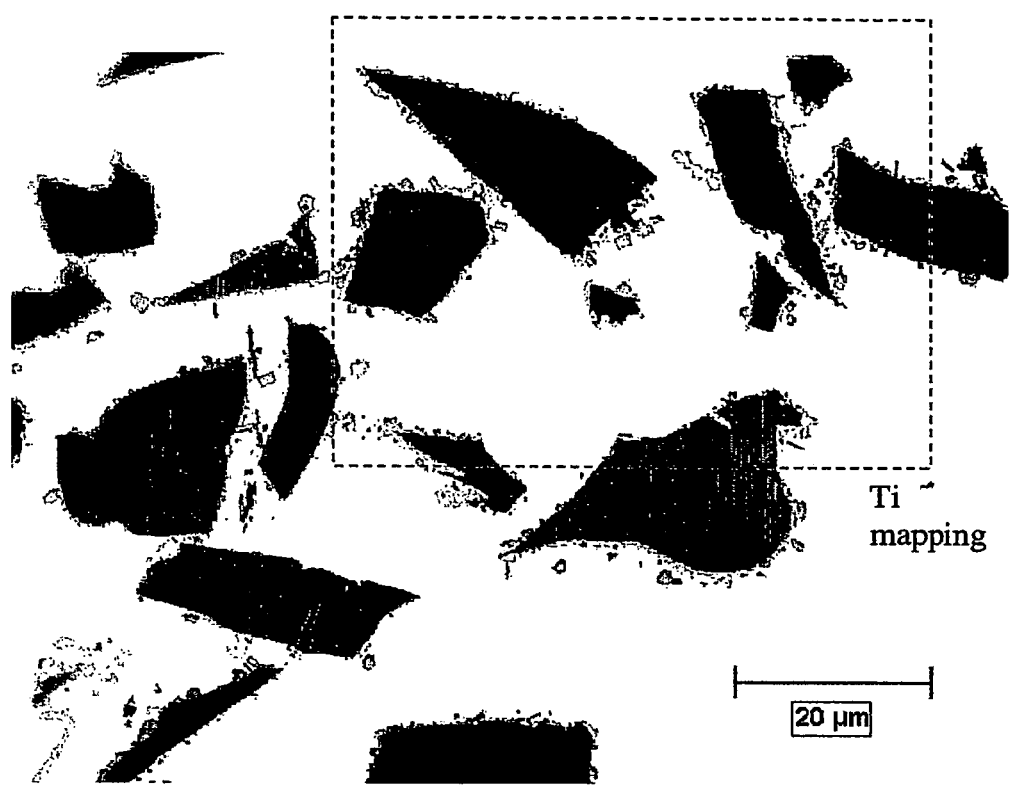
FIG. 1 is a micrograph showing a composite according to the present invention containing added titanium in an aluminum (AA1xxx) matrix.

Using the technique of U.S. Pat. No. 4,786,467, composites were prepared in which boron carbide particulate was mixed with matrix alloys having the following compositions:

TABLE 1

| Matrix Alloy | Si | Fe | Cu | Mg | Zn | Ti |
|---|---|---|---|---|---|---|
| Alloy 1 (wt %) | 0.54 | 0.23 | 0.23 | 0.91 | — | 0.004 |
| Alloy 2 (wt %) | 0.04 | 0.63 | 0.085 | 0.004 | 0.006 | 0.015 |

In the case of Alloy 1 (containing 0.91% Mg), upon addition of only 7.5% by volume of boron carbide, the mixture became highly viscous and could not be stirred further.

In the case of Alloy 2 (containing only trace amounts of Mg), 15% by volume of boron carbide was added without any stirring problems. This composite material was then held for one hour and was still sufficiently fluid for casting. Samples taken from the cast ingots using Alloy 2 were rolled on a laboratory rolling mill to thickness of between 1.65 and 2.20 mm, and the samples were subjected to neutron absorption tests. An average neutron attenuation coefficient of 1.06 μm/mm was obtained.

EXAMPLE 2

A further composite was prepared according to the methods outlined in U.S. Pat. No. 4,786,467 in which 15% by volume of boron carbide particulate was combined with an Al-8.7% Si alloy containing only 0.01% Mg by weight.

This material was held for 1.5 hours and still retained sufficient fluidity to be cast easily. The matrix alloy was similar to alloys disclosed in U.S. 5,186,234 commonly used for manufacture of metal matrix composites using SiC reinforcement, except that the Mg level was again at trace level rather than the normal level of at least 0.3% by weight specified for such alloys.

EXAMPLE 3

A further set of composites was prepared according the methods in U.S. Pat. No. 4,786,467 in which 15% by volume of boron carbide particulate was added to AA1xxx and AA4xxx base alloy containing various added concentrations of titanium. The fluidity of the resulting mixture after holding the composite for various times was tested by casting the composite into a book mould in the form of an elongated horizontal strip 6 mm thick having spaced restrictions every 36 mm along the strip, where the restriction reduced the thickness to 3 mm at that point. The distance that the composite flowed along the mould before solidifying was a measure of its fluidity. A "fluidity" of greater than 50 mm was considered acceptable.

In Table 2 fluidity measurements at various holding times are given for a base aluminum alloy containing 0.02 wt % Si, 0.13wt % Fe, 0.003 wt % Cu, 0.002 wt % Mg, 0.001 wt % Mn, 0.002 wt % Zn. The base alloy also contained 0.001 wt % Ti and to this alloy varying amounts of titanium were added up to 2.0 wt % Ti. The results in Table 2 show that for less than 0.2 wt % Ti, the fluidity falls in time and becomes unacceptable after holding for about one hour. At 0.2 wt % Ti, the fluidity remains useable for up to one hour and for increasing titanium additions, the stability of fluidity time increases rapidly. A value of 240 mm represents complete filling of the mould.

TABLE 2

(Fluidity in mm)

| Ti | Holding time (minutes) | | | |
|---|---|---|---|---|
| | 10 min | 20 min | 40 min | 60 min |
| 0.001 wt % | 120 mm | 90 mm | 65 mm | 30 mm |
| 0.2 wt % | 130 mm | 95 mm | 70 mm | 50 mm |
| 0.5 wt % | 212 mm | 155 mm | 97 mm | 70 mm |
| 1.0 wt % | 240 mm | 240 mm | 205 mm | 195 mm |
| 1.5 wt % | 240 mm | 240 mm | 240 mm | 240 mm |
| 2.0 wt % | 240 mm | 240 mm | 240 mm | 240 mm |

In Table 3 fluidity measurements at various holding times are given for a base aluminum alloy of the AA4xxx type containing 4.2 wt % Si, 0.12wt % Fe, 0.06 wt % Cu, 0.02 wt % Mg, 0.16 wt % Mn, 0.003 wt % Zn. The base alloy also contained 0.07 wt % Ti and to this alloy varying amounts of titanium was also added to make 1 wt % Ti in the matrix. Again the fluidity of the mixture at low titanium became unusable at 60 minutes, whereas 1 wt % Ti gave a high degree of stability.

TABLE 3

(Fluidity in mm)

| Ti | Holding time (minutes) | | | |
|---|---|---|---|---|
| | 10 min | 20 min | 40 min | 60 min |
| 0.07 wt % | 120 mm | 90 mm | 60 mm | 35 mm |
| 1 wt % | 240 mm | 240 mm | 240 mm | 205 mm |

Figure 2:
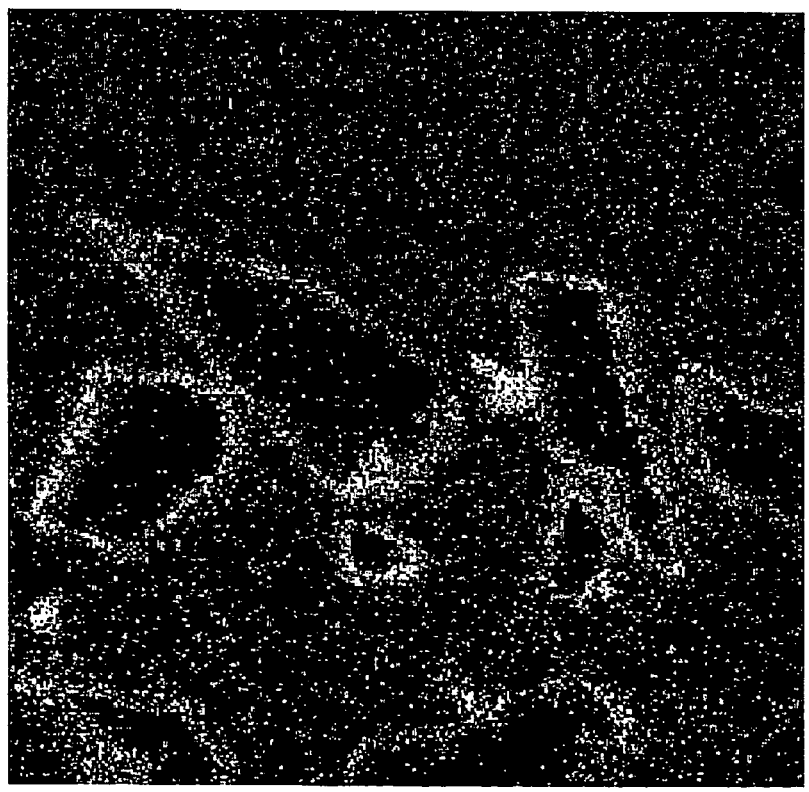
FIG. 2 is a titanium element map of a portion of the micrograph of FIG. 1.

A sample of the composite in Table 2 having 1 wt % titanium and taken after 10minutes holding was examined metallographically and the results are shown in FIGS. 1 and 2. The composite shows the presence of boron carbide particles decorated with small precipitated particles covering the surfaces. An elemental map (FIG. 2) shows that this layer contains titanium. More detailed analysis of the layer showed that it was formed of Ti and B or C containing compounds (nominally $TiB_2$ or TiC). The spaces between the particles showed no Ti-Al intermetallics which would normally be present in abundance in a 1 wt % Ti containing aluminum matrix.

EXAMPLE 4

A matrix having the AA6351 composition except for magnesium was prepared and 15 volume% boron carbide powder mixed into it to create a composite. An amount of magnesium sufficient to provide 0.6 wt % Mg in the matrix was immediately added into the mixing vessel after mixing the boron carbide powder and the liquid composite was held and stirred with an impeller at 500 rpm. The torque applied to the impeller was measured in time. Table 4 shows the torque (in arbitrary units) that was developed in time.

TABLE 4

| | Holding time after Mg addition (min) | | | | |
|---|---|---|---|---|---|
| | 0 | 5 | 10 | 20 | 40 |
| Torque developed (arbitrary units) | 32 | 37 | 46 | 50 | 57 |

From experience, a torque of greater than 50 units at 500 rpm means that the castability of the mixture has deteriorated excessively. The above example shows that at 0.6% added Mg this occurs after about 20 minutes after the magnesium addition. However, if the composite is cast within about 20 minutes of the magnesium addition, it retains sufficient fluidity for casting.

EXAMPLE 5

A composite based on an AA6xxx matrix and containing 15 vol % boron carbide particles was prepared with different levels of titanium and where magnesium was added after specified holding times. A base aluminum alloy containing 1.0 wt % Si, 0.11 wt % Fe, 0.001 wt % Cu, 0.002 wt % Mg, 0.01 wt % Zn was prepared. The base alloy also had 0.001 wt % Ti. The fluidity measured as in Example 3 at 20 and 40 minutes holding times after preparation of the initial composite with low Ti and with 1 wt % titanium at which time magnesium sufficient to give 0.8 wt % Mg in the matrix was added, and the fluidity again measured after 2 to 5 minutes further mixing. The 2 to 5 minutes is typical of the residence time in a metallurgical casting trough. Table 5 shows that the addition of 0.8 wt % Mg to an alloy with low titanium causes excessive deterioration of the fluidity in a short time, whereas 1% of titanium stabilizes the composite sufficiently than even 0.8 wt % Mg additions can be cast more readily that composites low in both Ti and Mg.

TABLE 5

(Fluidity in mm)

| Titanium addition | Magnesium addition | Holding time (Minutes) | |
|---|---|---|---|
| | | 20 min | 40 min |
| 0.001 wt % | None | 90 mm | 65 mm |
| 0.001 wt % | 0.8 wt % | 60 mm | 35 mm |
| 1 wt % | None | 240 mm | 205 mm |
| 1 wt % | 0.8 wt % | 160 mm | 110 mm |

Figure 3:
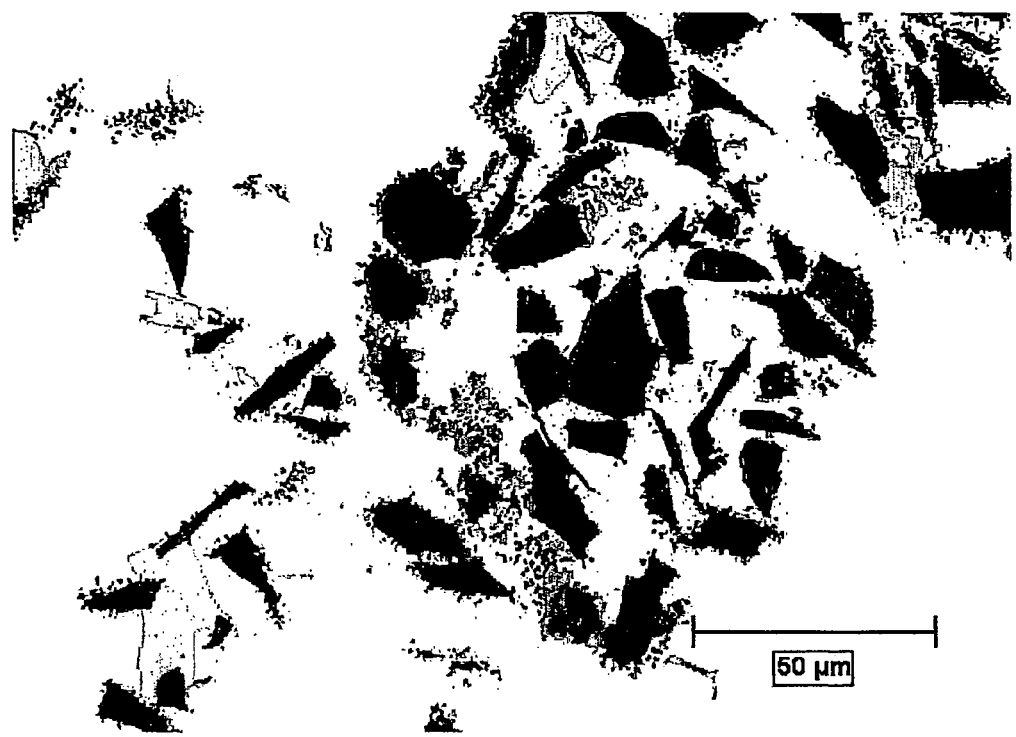
FIG. 3 is a micrograph of a composite according to the present invention having an aluminum (AA6xxx) alloy matrix without added titanium.
Figure 4:
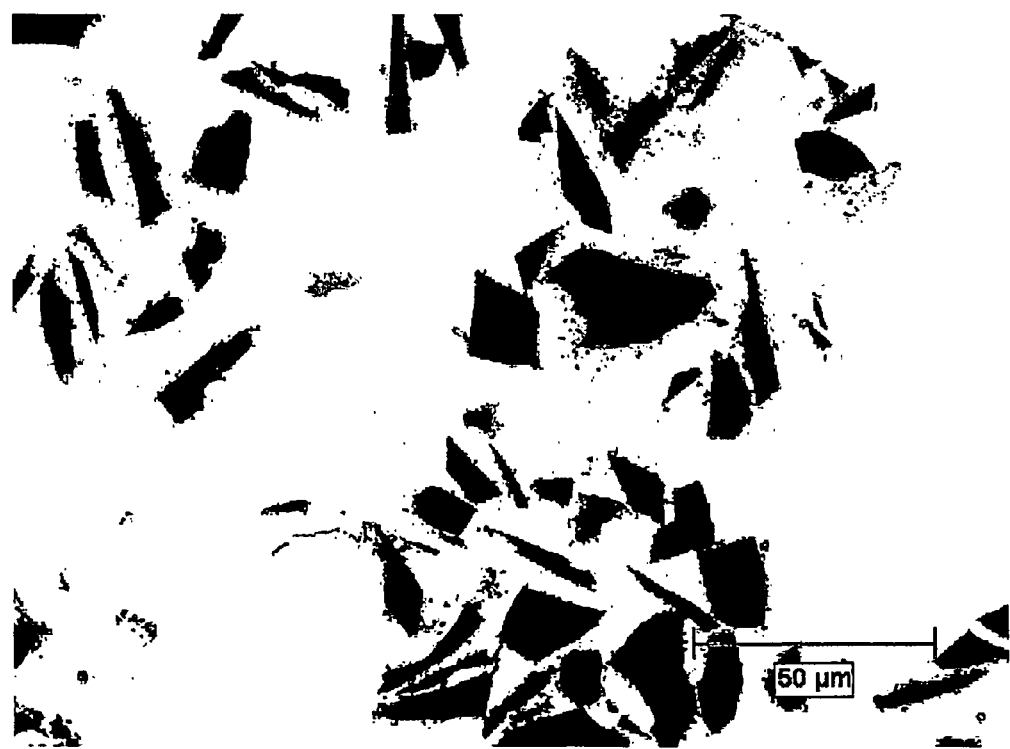
FIG. 4 is a micrograph of a composite according to the present invention having the same matrix as FIG. 3 but with added titanium.

Samples were examined metallographically after 40 minutes holding time in both cases. FIG. 3 represents the composite where no Ti was added prior to addition of boron carbide and FIG. 4 represents the composite where 1% Ti was added prior to addition of boron carbide (in accordance with present invention). In FIG. 3 there is substantial attack on the boron carbide and reacted aluminum carbide crystals are evident in the composite. In FIG. 4, the protective titanium containing layer is present on many of the particles and the attack on the boron carbide is much less and localized.

The invention claimed is:

1. A method of preparing a cast composite material, comprising the steps of: providing an aluminum-based matrix alloy; preparing a molten mixture of from about 10 to about 40 volume percent of free-flowing boron carbide particles and from about 90% to about 60 volume percent of a melt of said aluminum-based matrix alloy; stirring the molten mixture to wet the matrix alloy to the boron carbide particles and to distribute the particles throughout the volume of the melt; and casting the molten mixture to form a cast composite material;

characterized by maintaining the fluidity of the molten mixture by providing at least 0.5% by weight but no more than 5% by weight of Ti in the aluminum-based matrix alloy and by limiting any Mg in the aluminum-based matrix alloy to below 0.2% by weight, at least until completion of said distribution of said particles throughout said volume of said melt.

2. A method according claim 1, characterized in that the cast mixture is remelted and cast into a shape.

3. A method according to claim 1, characterized that the cast mixture is extruded into a shape.

4. A method according to claim 1, characterized that the cast mixture is rolled.

5. A method according to claim 1, characterized that the cast mixture is forged.

6. A method according to claim 1, characterized that the cast mixture is formed into a neutron absorbing material.

7. A method according to claim 1, characterized in that the aluminum-based matrix alloy contains not more than 4.2 weight % Si.

* * * * *